United States Patent
Bennett

[11] 3,843,000
[45] Oct. 22, 1974

[54] PAINTERS WHEEL SPINNER

[76] Inventor: Vern B. Bennett, 4601 Lake Rd., West Sacramento, Calif. 95691

[22] Filed: June 8, 1973

[21] Appl. No.: 368,018

[52] U.S. Cl. ............... 214/340, 118/500, 214/334
[51] Int. Cl. .............................................. B65g 7/00
[58] Field of Search .......... 214/330, 333, 334, 340; 248/425; 118/500

[56] References Cited
UNITED STATES PATENTS

| | | | |
|---|---|---|---|
| 1,171,807 | 2/1916 | Siberell | 214/333 |
| 2,610,750 | 9/1952 | Hulbert | 214/334 |
| 2,698,099 | 12/1954 | Durnal et al. | 214/340 |
| 3,653,340 | 4/1972 | Bugg | 248/425 X |

Primary Examiner—Robert G. Sheridan
Attorney, Agent, or Firm—Blair & Brown

[57] ABSTRACT

A painters wheel spinner for supporting and rotating a wheel while it is being painted. The device includes a pair of rollers arranged in spaced parallel relation for supporting and rotating the wheel with one of the rollers being rotated by an air motor. A frame extends upwardly from the rollers and carries a pair of vertically adjustable rollers for engaging opposite sides of the tire to hold it in erect position. A ramp is provided to permit the tire to be rolled up on to the drive rollers. This tire support is adjustable about a vertical pivot to align it with the painting apparatus and means is provided for locking the tire support against rotation about its vertical pivot during the painting operation.

1 Claim, 7 Drawing Figures

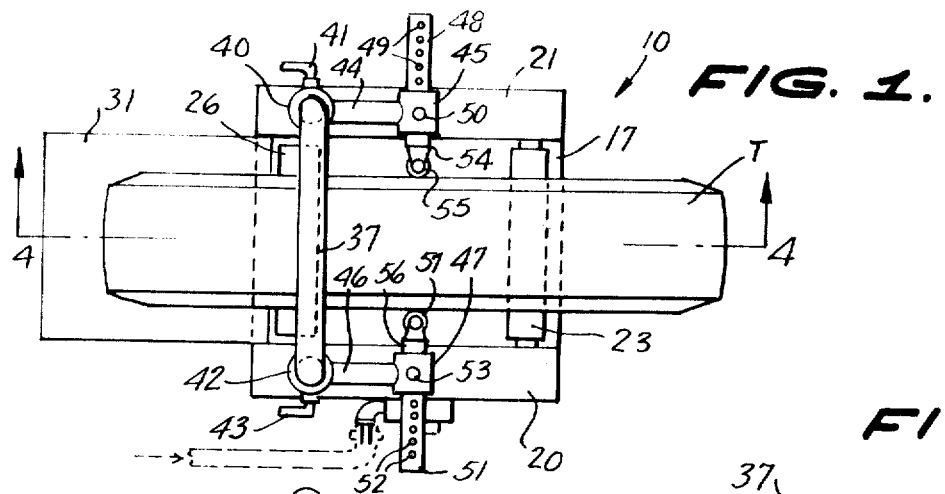
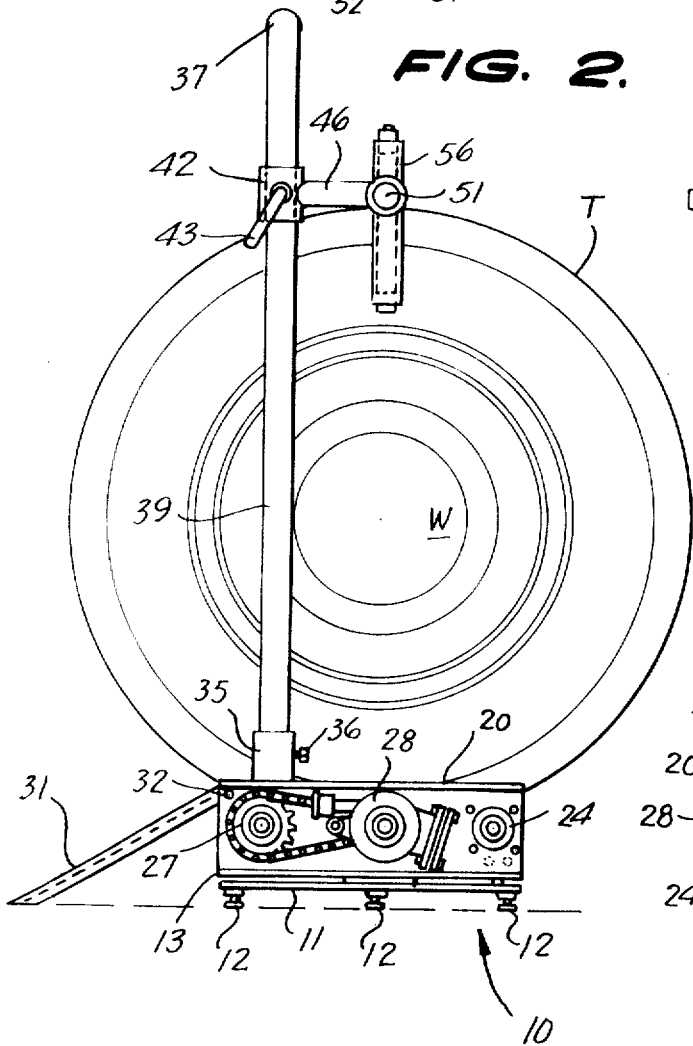
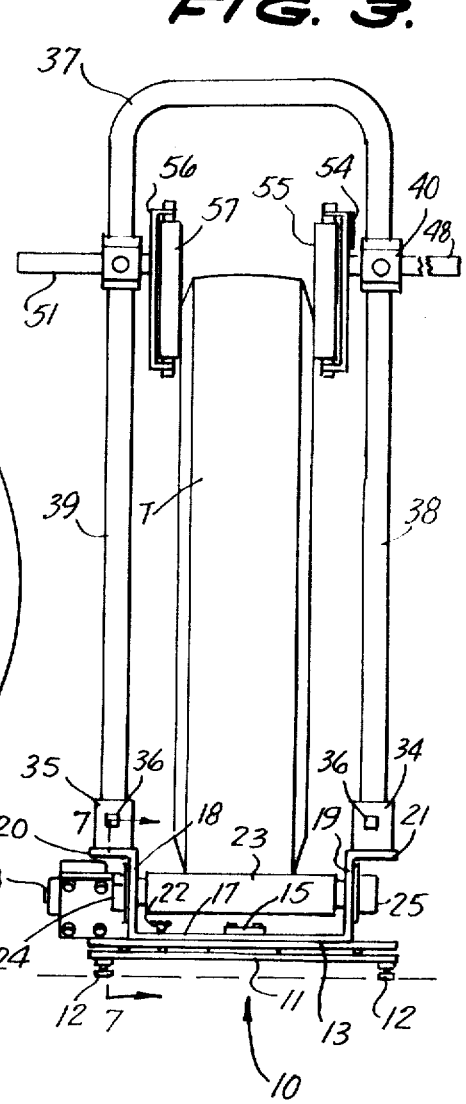

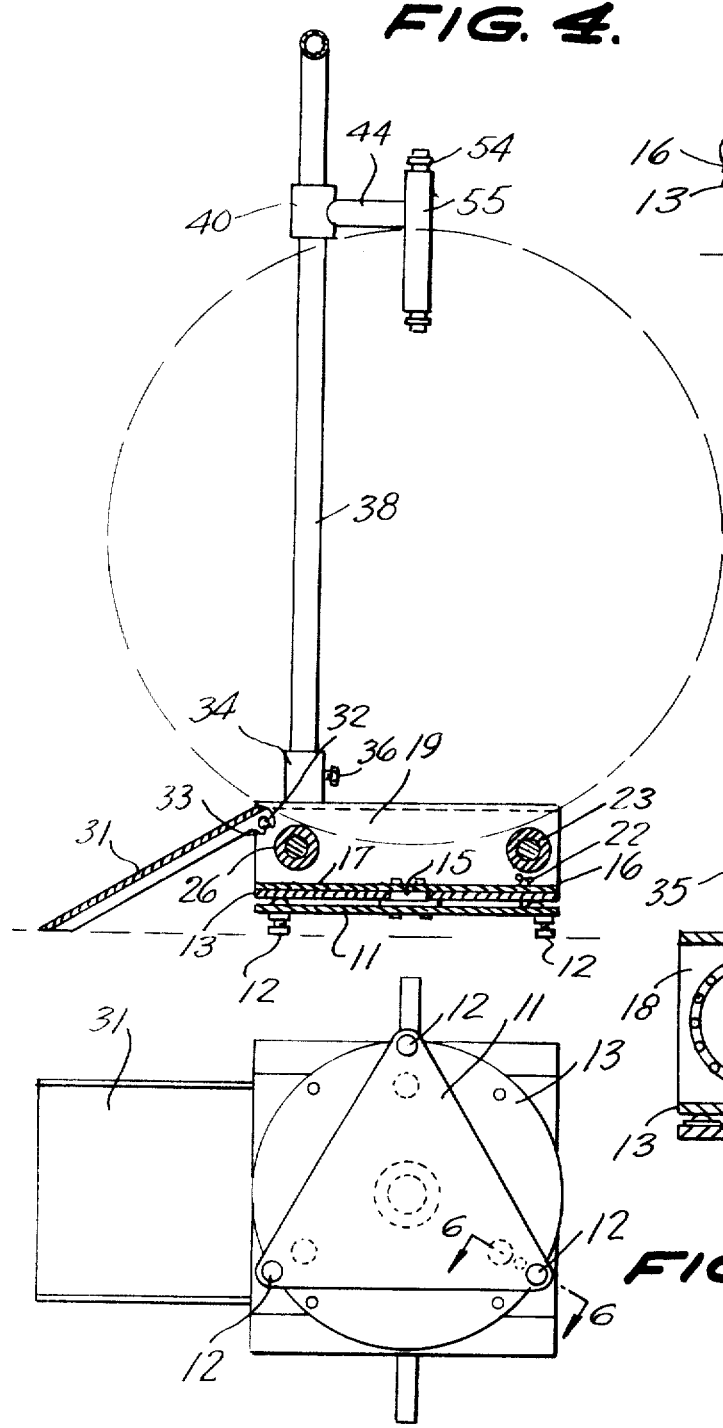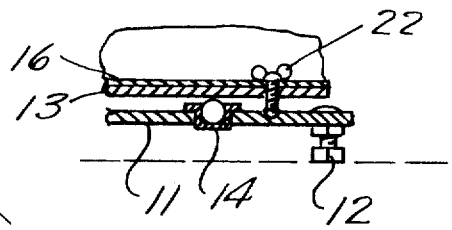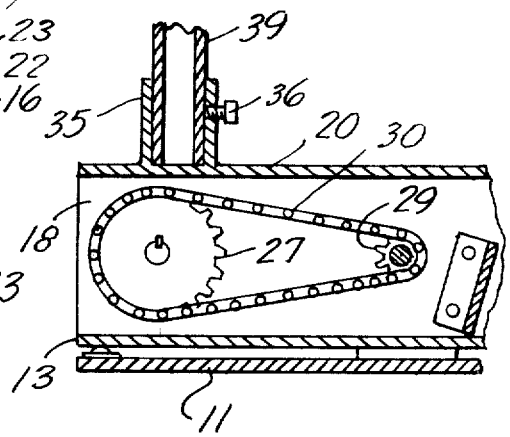

PAINTERS WHEEL SPINNER

BACKGROUND OF THE INVENTION

1. Field of the Invention

The present invention relates to a device for supporting and rotating a vehicle wheel with tire attached during a painting operation.

2. Summary of the Invention

The device comprises a lower drive frame supported for rotational adjustment about a vertical pivot on a base which can be level. A pair of rollers extend across the frame in spaced parallel relation with one of the rollers being driven by an air motor to rotate a tire supported thereon. A U-shaped vertical frame extends upwardly from the lower frame and carries spaced parallel rollers for engaging on opposite sides of the tire to support the tire during the painting operation. The rollers can be adjusted toward and away from each other to adapt to the width of the tire and can be vertically adjusted on the U-shaped frame to adapt to the height of the tire. A removeable ramp is provided to permit the tire to be rolled up onto the supporting rollers.

The primary object of the invention is to provide a steady support for rotating a tire and wheel while the wheel is being painted.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention;

FIG. 3 is an end elevation of the invention;

FIG. 4 is a vertical sectional view, taken along the line 4—4 of FIG. 1, looking in the direction of the arrows;

FIG. 5 is a bottom plan view of the invention;

FIG. 6 is an enlarged fragmentary vertical sectional view, taken along the line 6—6 of FIG. 5, looking in the direction of the arrows; and FIG. 7 is an enlarged fragmentary vertical sectional view, taken along the line 7—7 of FIG. 3, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a painters wheel spinner constructed in accordance with the invention.

The painters wheel spinner 10 is mounted on a generally triangular base plate 11 having an adjustable foot 12 at each corner thereof. By adjusting the feet 12 the base plate 11 maybe arranged in a horizontally level position.

A plate 13 circular in form is supported on a plurality of spaced roller bearings 14 carried by the base plate 11. The circular plate 13 is secured to the base plate 11 by an axial vertical pivot 15. A generally rectangular channel shaped frame member 16 has a flat bottom wall 17 with a pair of opposed side walls 18, 19 extending integrally upwardly therefrom in spaced parallel relation. The side walls 18, 19 have horizontal flanges 20, 21 integrally secured to their upper edges and lying in a horizontal plane.

A thumb screw 22 is threaded through the bottom wall 17 and circular plate 13 to engage the base plate 11 as can be clearly seen in FIG. 6 to lock the circular plate 13 against rotation with respect to the base plate 11. A horizontal idler roller 23 extends between the side walls 18, 19 and is journalled in bearings 24, 25 respectively. A horizontal drive roller 26 extends between and is supported in the side walls 18, 19. The drive roller 26 has a sprocket gear 27 secured to one end thereof.

A rotary pneumatic motor 28 is mounted on the side wall 18 and has a sprocket 29 forming a part thereof. A drive chain 30 is trained over the sprockets 27, 29 so that the gear motor 28 may drive the roller 26 under the control of the operator.

A ramp 31 is detachably mounted on a pair of pins 32 on the side walls 18, 19 respectively by means of slots 33 formed in one end of the side edges of the ramp 31.

A vertical socket 34 is mounted on the flange 21 and a second vertical socket 35 is mounted on the flange 20. Each of the sockets 34, 35 has a set screw 36 threaded therein. An inverted U-shaped vertical tubular frame 37 includes a pair of legs 38, 39 which respectively engage in the sockets 34, 35. The set screws 36 clamp the leg 38, 39 in the sockets 34, 35 so that the frame 37 is rigid with respect to the lower frame 16.

A sleeve 40 is vertically slidably mounted on the leg 38 and is adjustably secured thereto by a clamping bolt 41. A cylindrical sleeve 42 is vertically adjustably mounted on the leg 39 and is clamped in adjusted position thereon by a clamp bolt 43.

A generally horizontal post 44 is secured to the sleeve 40 and has a sleeve 45 secured to its outer end with the axis of the sleeve 45 being perpendicular to the axis of the sleeve 40. A generally horizontal post 46 is secured to the sleeve 42 and has a sleeve 47 secured to its opposite end with its axis aligned with the axis of the sleeve 45. A shaft 48 is horizontally adjustably mounted in the sleeve 45 and has a plurality of spaced bores 49 formed therein to receive a pin 50 which pierces the sleeve 45. A generally horizontal shaft 51 is adjustably slidably mounted in the sleeve 47 and has a plurality of spaced bores 52 formed therein to receive a pin 53 which pierces the sleeve 47.

A yoke 54 is secured to the shaft 48 and has a vertically arranged roller 55 journalled therein. A yoke 56 is rigidly secured to the shaft 51 and has a vertically arranged roller 57 journalled therein. The rollers 55, 57 are arranged in spaced parallel relation and can be adjusted through the sleeves 45, 47 to vary the spacing therebetween to fit the side walls of a tire tee supported on the rollers 23, 26. The sleeves 40, 42 can be vertically adjusted so as to adapt the rollers 55, 57 to the height of the tire tee as required.

In the use and operation of the invention the tire tee mounted on its wheel W is rolled up the ramp 13 and is supported on the rollers 23, 26. The rollers 55, 57 are then adjusted so as to engage the sides of the tire tee to hold it steadily on the rollers 23, 26. The air motor 28 is then energized to rotate the roller 26 and thus the tire tee while paint is applied to the wheel W by any desired means such as brush painting, or roller painting.

Having thus described the preferred embodiment of the invention it should be understood that numerous structural modifications and adaptations may be re- sorted to without departing from the spirit of the invention.

What is claimed is:

1. In a painters wheel spinner, a base plate, a plate circular in form supported on a plurality of spaced roller bearings carried by said base plate, said circular plate being secured to the base plate by an axial vertical pivot, a frame member having a flat bottom wall with a pair of opposed side walls extending integrally upwardly therefrom in spaced parallel relation, said side walls having horizontal flanges integrally secured to their upper edges and laying in a horizontal plane, a screw member threaded through the bottom wall and circular plate for engaging the base plate to lock the circular plate against rotation with respect to the base plate, a horizontal idler roller extending between the side walls and journalled in bearings, a horizontal drive roller extending between and supported in said side walls, said drive roller having a sprocket gear secured to one end thereof, a rotary pneumatic motor mounted on a side wall and having a sprocket forming a part thereof, a drive chain trained over said sprockets, a ramp detachably mounted on pins on the side walls by means of slots formed in side edges of the ramp, a vertical socket mounted on each flange, and each socket having a set screw threaded therein, a tubular frame including a pair of legs respectively engaging in the sockets, sleeves vertically slidably mounted on the legs and clamped in position thereon, posts secured to said sleeve, a horizontally adjustable shaft mounted in one of said sleeves and said shaft having bores for selectively receiving a pin, a yoke secured to the shaft and having a vertically arranged roller journalled therein, and said last named rollers being arranged in spaced parallel relation and being adjustable to the sleeves.

* * * * *